(12) United States Patent
Joutras et al.

(10) Patent No.: US 11,176,566 B2
(45) Date of Patent: Nov. 16, 2021

(54) ONLINE REWARD SYSTEM

(71) Applicants: Richard K. Joutras, Oak Brook, IL (US); Sean Quinn, Chicago, IL (US)

(72) Inventors: Richard K. Joutras, Oak Brook, IL (US); Sean Quinn, Chicago, IL (US)

( * ) Notice: Subject to any disclaimer, the term of this patent is extended or adjusted under 35 U.S.C. 154(b) by 91 days.

(21) Appl. No.: 16/374,678

(22) Filed: Apr. 3, 2019

(65) Prior Publication Data

US 2019/0303962 A1    Oct. 3, 2019

Related U.S. Application Data

(60) Provisional application No. 62/651,994, filed on Apr. 3, 2018.

(51) Int. Cl.
| | | |
|---|---|---|
| *G06Q 30/00* | (2012.01) | |
| *G06Q 30/02* | (2012.01) | |
| *G06Q 50/00* | (2012.01) | |
| *G06Q 20/12* | (2012.01) | |

(52) U.S. Cl.
CPC ..... *G06Q 30/0214* (2013.01); *G06Q 30/0247* (2013.01); *G06Q 30/0269* (2013.01); *G06Q 50/01* (2013.01); *G06Q 20/12* (2013.01)

(58) Field of Classification Search
CPC .......... G06Q 30/0214; G06Q 30/0247; G06Q 30/0269; G06Q 50/01; G06Q 20/12
USPC ....................................................... 705/14.16
See application file for complete search history.

(56) References Cited

U.S. PATENT DOCUMENTS

| | | | | |
|---|---|---|---|---|
| 2009/0265257 | A1* | 10/2009 | Klinger | G06Q 30/0601 705/26.1 |
| 2010/0241576 | A1* | 9/2010 | Beeri | G06Q 30/02 705/80 |
| 2013/0103484 | A1* | 4/2013 | McLaughlin | G06Q 30/0226 705/14.33 |

* cited by examiner

*Primary Examiner* — Sun M Li
(74) *Attorney, Agent, or Firm* — K&L Gates LLP

(57) ABSTRACT

The present system provides users engaging with sharing platforms a method to monetize their contribution in generating ad revenue for various advertisers. The system can quantify the user contribution based on the user's behavior and action related to individual ads on the sharing platforms. The system provides a method of monetizing a user's contribution to ad revenue, thereby incentivizing users to share the selected ad to the user's audience.

6 Claims, 2 Drawing Sheets

ONLINE REWARD SYSTEM

CROSS-REFERENCE TO RELATED APPLICATIONS

This application incorporates by reference and claims the benefit of priority to U.S. Provisional Application 62/651,994 filed on Apr. 3, 2018.

BACKGROUND OF THE INVENTION

The present subject matter relates generally to an online reward system for advertisements.

Sharing user content over sharing platforms such as social media sites (e.g., Facebook™, LinkedIn™, Twitter™, Pinterest™, etc.) and/or online platforms (e.g., websites, applications, blogs, YouTube™, etc.) is a common form of communication. As a result of their popularity, advertisers have taken advantage of the platforms to promote their products and services.

Typically, a service provider associated with sharing platforms controls and manages the external advertising content. For examples, a user may gain free access to the sharing site in exchange for having the external content associated with their content at the expense of the external content provider and to the profit of the service provider. The user may have no control over the external content being presented alongside their selected user content. Further, the external content may or may not be relevant to the user and/or the user's audience. As a result, the external content may not be as effective as it would be, for example, if the ad was selected or targeted to the user's audience.

Accordingly, there is a need for a system that incentivizes both the advertisers and users to cooperate in sharing and engaging with individually designed advertisements.

BRIEF SUMMARY OF THE INVENTION

The present disclosure provides an online reward system in which advertising revenue is used to provide two separate funds to compensate advertisement hosts and to compensate online users.

In one embodiment of the system, there are three classifications of users: Administrators—administrating the funds; Advertisers—hosting ads on their sites/apps; Users—online users of the sites/apps. Additionally, the Administrators carve up the total advertising revenue they generate into two funds: the Advertisers' Compensation Fund and the Users' Compensation Fund.

The Advertisers get paid according to the percentage of views the ads they host receive compared to the total views of ads across all of the Advertisers' platforms. In a simple example, if a certain website is responsible for 10% of the total views of a given ad, then the owner of that site should get 10% of the portion of the Advertisers' Compensation Fund corresponding to that ad.

The Users get paid according to their activities with respect to the ads. Users get credit for: (1) content of theirs that is liked; (2) liking others' content; and (3) sharing content. In a simple example, if a user is responsible for half of the likes that an ad receives online, that user is compensated with half of the portion of the Users' Compensation Fund corresponding to likes of a given ad. Various examples of the systems and methods are provided herein.

The present system provides users engaging with sharing platforms a method to monetize their contribution in generating ad revenue for various advertisers. The system can quantify the user contribution based on the user's behavior and action related to individual ads on the sharing platforms (e.g., Facebook™, LinkedIn™, Twitter™, Pinterest™, websites, applications, blogs, YouTube™, etc.). The system provides a method of monetizing a user's contribution to ad revenue, thereby incentivizing users to share the selected ad to the user's audience (e.g., posting the selected ad on the user's social media feed, blog, website, etc.).

In an example, the system connects advertisers and users of the sharing platforms to manage total advertising revenue to incentivize both users and advertisers. For example, the system can divide the total advertising revenue into two funds: (1) advertisers' compensation fund and (2) users' compensation fund. In an example, a system administrator can administrate or otherwise manage and distribute the funds.

For example, the advertisers can be compensated according to the percentage of views the ads they create receive compared to the total views of ads across all of the advertisers' platforms. In a simple example, if a certain website is responsible for 10% of the total views of a given ad, then the owner of that site should get 10% of the portion of the advertisers' compensation fund corresponding to that ad. Of course, more complex examples may include additional weighting factors such as, for example, a multiplier applied based on the desirability of a given site's demographics.

The users can be compensated according to their activities with respect to the ads. For example, users may receive credit for: (1) content of theirs that is liked; (2) liking others' content; and (3) sharing content. Of course, the system may be adapted to reward even more complex chains of user activity such as by tracking and rewarding users based on the number of shares content they shared received (i.e., second order sharing) or the combined total number of likes received at each level of sharing that flows from a user's activity.

In one example provided herein, a system includes: a controller; a memory coupled to the controller, wherein the memory is configured to store program instructions executable by the controller; wherein in response to executing the program instructions, the controller is configured to: receive ad content from an advertiser through an advertiser user interface; select at least one user to receive the ad content, wherein the user is selected from a plurality of users stored in a database in communication with the controller; display the ad content on a user interface associated with the selected user; receive a user ad selection via the user interface; store the user ad selection associated with the selected user in the database; monitor user behavior associated with the user ad selection on the user shared platform; determine a total ad revenue of the selected ad; update an advertiser account in the database with the determined total ad revenue for the selected ad associated with the advertiser; calculate, based on the monitored user behavior, a user portion of the total ad revenue generated by the selected user, wherein the user portion is in the form of user points; update the user account in the database with user points; and display the user points on the user interface associated with the user.

The controller may be configured to provide an online virtual store associated with the advertiser, wherein the online virtual store offers products for sale associated with the advertiser. The controller may be configured to receive a product from the online virtual store selection from a user via the user interface, wherein the controller completes payment of the selected product by deducting user points from the user account in the database. The controller may be configured to update the advertiser account in the database with the received payment of the purchased product.

The system may receive at least one ad parameter from the advertiser, wherein the ad parameter includes demographic data associated with the ad content. The system may receive ad parameters from the advertiser, wherein the ad parameters include at least one user incentive value associated with the ad.

The user may be selected based on user demographics matching demographic data associated with the ad content. The user may be selected based on a number of followers of a shared platform associated with the user. The user behavior may be sharing the selected ad on a shared platform associated with the user. The shared platform may be a social media network.

In another example, a system includes: one or more social network servers providing one or more social media environments to one or more users; a database storing a plurality of user records and a plurality of advertiser records each associated with ad records which record the interactions of the one or more users with respect to ads in the one or more social media environments; a controller in communication with the one or more social network servers and the database; a memory coupled to the controller, wherein the memory is configured to store program instructions executable by the controller such that, in response to execution of the program instructions, the controller; receive an accounting of funds allocated to a pool of advertising revenue; apportion the funds allocated to the pool of advertising revenue between an advertiser compensation pool record and a user compensation pool record, each of the records stored in the database; disburse the funds apportioned to the advertiser compensation pool record on a pro rata basis according to the relative performance of associated advertiser ads within the one or more social media environments; and disburse the funds apportioned to the user compensation pool record on a pro rata basis according to the relative activity of the one or more users with respect to the advertiser ads within the one or more social media environments.

The step of disbursing the funds apportioned to the advertiser compensation pool record on a pro rata basis according to the relative performance of the associated advertiser ads within the one or more social media environments may include measuring the relative performance of the associated advertiser ads by counting user interactions with each advertiser ad over a period of time and paying each advertiser associated with each ad an amount of the advertiser compensation pool proportional to each ad's relative performance within the period of time. The categories of user interactions may include one or more of views, likes, shares, and comments and user interactions in the one or more of the categories of user interactions may be weighted to count more or less than user interactions in the remaining categories of user interactions.

The step of disbursing the funds apportioned to the user compensation pool record on a pro rata basis according to the relative activity of the one or more users with respect to the advertiser ads within the one or more social media environments may include measuring the relative activity of each user by counting the number of desired user interactions each user has with each of the advertiser ads over a period of time and paying each user an amount of the user compensation pool proportional to each user's relative activity within the period of time. The categories of desired user interactions may include one or more of views, likes, shares, and comments and the desired user interactions in one or more of the categories of desired user interactions may be weighted to count more or less than user interactions in the remaining categories of user interactions.

The controller may also provide an online virtual store providing at least one product for sale related to at least one of the advertiser ads, wherein revenue generated by sales in the online virtual store is distributed, at least in part, into the pool of advertising revenue.

An advantage of the present system is providing a method for incentivizing social network users to share more, engage with the site/app longer, and engage with advertisers through ecommerce rewards.

Another advantage of the present system is that it enables advertisers the ability to better promote ads by providing specific incentives for users' interactions with the ads.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

The present system provides a system and method for compensating social network advertisers and users based on user interactions with the advertisements, in which advertisers are compensated for the performance of their ads and users are compensated for their interactions with the ads.

Throughout the description, the system is described as receiving ads associated with an advertiser and communicating the ads to a number of users to share on one or more sharing/social platforms. Although the primary examples in the description are directed to an example of sharing ads, it is contemplated that any external content can be used in the present system (e.g., music, videos, articles, etc.). For example, a first compensation pool may be created to be shared amongst content creators providing music files to the system based on the user interaction with the music files and a second compensation pool may be created to be shared amongst the users based on their interaction with the music files.

In the primary examples provided herein, the system works in conjunction with known social media websites and/or applications. In other examples, the system is incorporated into its own social media platform.

Figure 1:
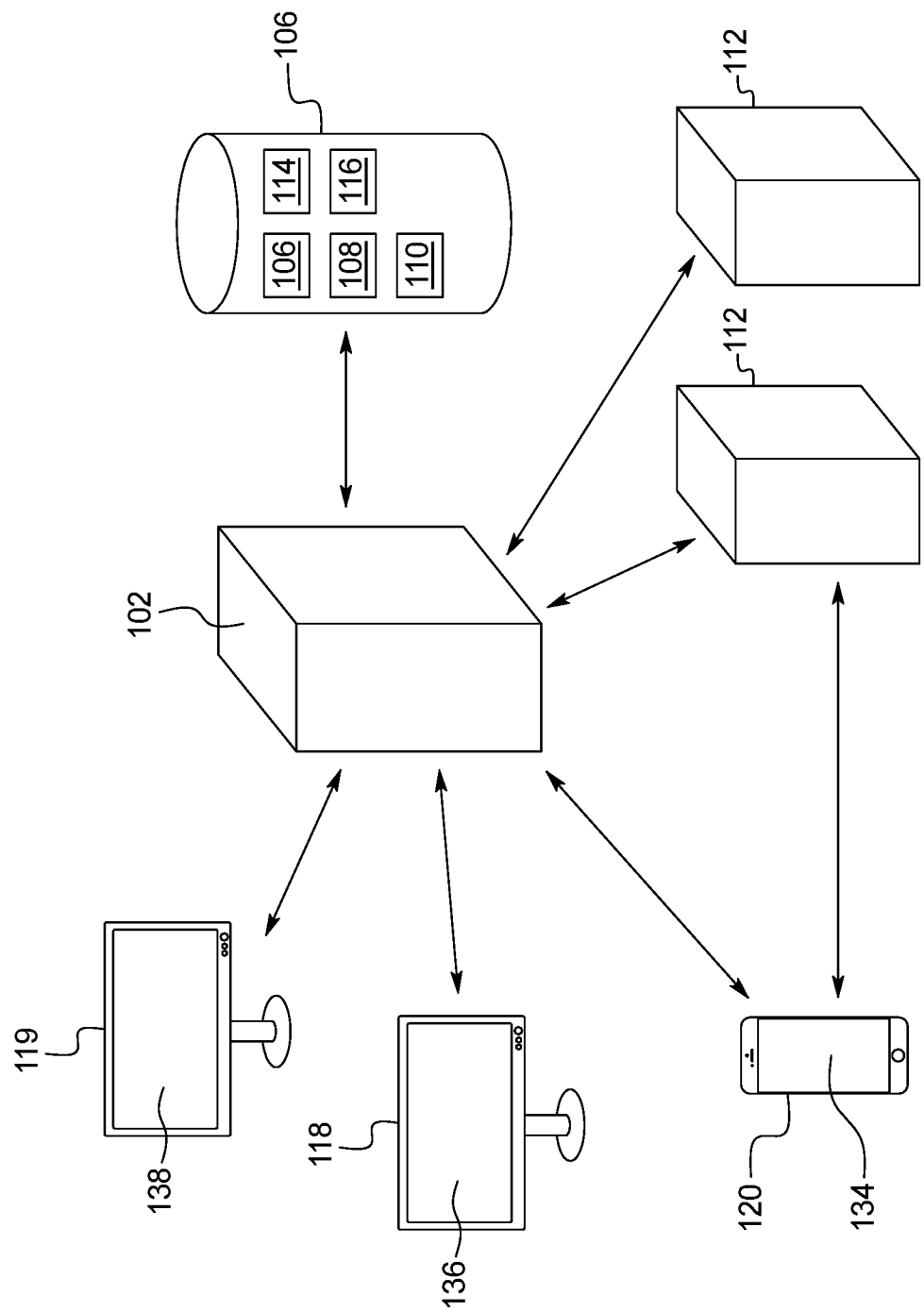
FIG. 1 is a schematic diagram of a system for compensating social network advertisers and users based on user interactions with the advertisements.

Turning to FIG. 1, in a primary embodiment, the system 100 includes a server 102 controlling the operation of the components of the system 100, including a database 104 storing a plurality of user records 106 and a plurality of advertiser records 108 each associated with ad records 110 which record the interactions of the users with respect to the ads in one or more social networks, each represented by a social network server 112. The system 100 stores and updates an advertiser compensation pool record 114 and a user compensation pool record 116, stored in the database 104. The server 102 also interacts with one or more advertiser devices 118, one or more system administrator devices 119, and one or more user devices 120 through which advertisers and users interact with the system 100, respectively.

In an example of the system 100 shown in FIG. 1, the server 102 provides access to one or more ad records 110 to advertisers, branders, and ad space providers (described herein as "advertisers") through an advertiser device 118 such that the advertisers may promote one or more of the ads associated with the ad records 110 via their respective platforms. For example, an advertiser may select a given ad associated with an ad record 110 in the database 104 for publication on the advertiser's social network server 112. Accordingly, it is possible to track the population of ads throughout related social networks such that they are attributed to a specific advertiser.

The server 102 also provides access to one or more ad records 110 to a user through a user device 120. Such user access may enable the users to create content to be posted on one or more social networks, websites, content, using the ad records 110. Similarly, the users may interact with the ads related to the ad records 110 directly through their appearance in the one or more social networks, for example in response to the ad being promoted by one of the advertisers in a given social network. Such access to the ads may be directly between the user devices 120 and the social network servers 112 or may be made through the server 102.

In either case, the server 102 can select which user(s) to receive a given ad based on each user's interests, preferences, profile, demographics, etc. In an example, the server 102 selects users to receive an ad based on the number of user contacts, follower, friends, etc. in the social network associated with the user. The server 102 (or social network server 112) can display the ad received from the advertiser on the user device 120 associated with the selected user. The user can then select at least one ad to publish, republish, like, comment, share, etc. on one or more of the user's social networks, website, application, etc. The user's promotion of the one or more ads may be limited by or dictated by parameters associated with the ad set by the advertiser.

The system 100 may require a user to be verified before being eligible to participate in the systems and methods described herein. In one example, the user can be associated with a communication identifier (e.g., phone number, pseudonym, email address, social media account, etc.) before the system 100 enables the user to access a user interface in communication with the server 102 or via one or more of the social network servers 112. In addition, the user may be required to have a major credit card and mailing address as a form of authorization to participate in the system 100.

The system 100 can enable users to tailor their advertising profiles to suit their interests. For example, users can select from a variety of categories to optimize their time online and experience. The system 100 can take a user's preferences into account when suggesting specific ads from which the user can select to display or promote on the user's shared platform (e.g., social media page, website, and/or application).

The system 100 can incentivize users for behaviors with the ads, wherein the incentive can be in the form of monetary currency, points, shares of a user fund, or any other suitable compensation. For example, the system 100 can offer points to users based on user behaviors with an ad (e.g., sharing the ad on the user's social media page) as an incentive for the user. The system 100 can distribute a portion of the ad revenue to the users in the form of user shares of the revenue according to the level of activity generated based on user's interaction with the ad.

In an example of the system 100, there may be an incentive value for each ad, or a plurality of incentive values associated with different levels of user activity, wherein, collectively, the received funds are used to fund both the advertiser compensation account and the user compensation account.

Figure 2:
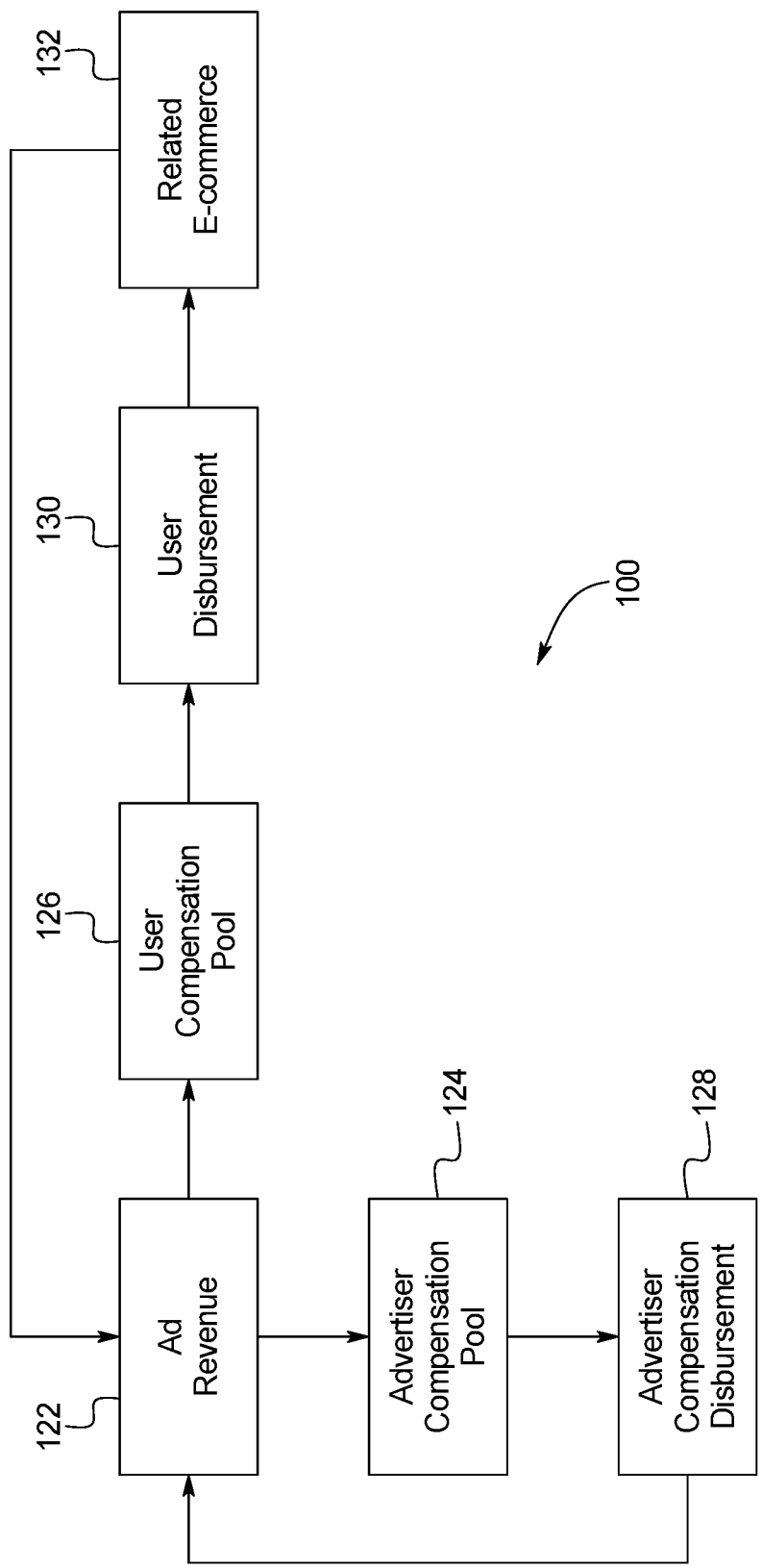
FIG. 2 is a schematic diagram illustration the operation of the system shown in FIG. 1.

FIG. 2 is a schematic representing the operation of an example of the systems and methods taught herein. As shown in FIG. 2, the system 100 receives a pool of advertising revenue 122 that is allocated into an advertiser compensation account 124 and a user compensation account 126. The funds from the advertiser compensation account 124 and a user compensation account 126 get disbursed to the advertisers and users via an advertisement compensation disbursement module 128 and a user disbursement module 130, respectively.

The system 100 shown in FIG. 2 includes a database 104 associating the advertiser compensation account 124 with the advertiser compensation pool record 114 and the user compensation account 126 with the user compensation pool record 116. The database 104 further stores additional data sets including individual advertiser records 108 associated with ad records 110 and accumulated advertiser revenue and individual user records 106 associated with user identification, ad records 110, and accumulated user revenue (e.g., user points).

The system 10 allocates the advertisers compensation account 124 into advertiser shares through the advertisement compensation disbursement module 128 for each advertiser, wherein the advertiser shares are allocated based on the pro rata share of the user interactions with the advertiser's advertisements.

For example, in one model, the advertiser shares are allocated based on a calculation of the number of views, or similar defined behaviors, associated with a single advertisement over a period of time divided by the total views of all advertisements sharing in the advertisers compensation account 124 over the same period of time. Similarly, the calculation may be based on any one type of defined behavior or any combination of defined behaviors (e.g., shares, likes, etc.).

As noted, the advertisement compensation disbursement module 128 can distribute the allocated advertiser shares for each advertiser periodically (e.g., weekly, monthly, bi-annually, etc.). The advertiser shares can be distributed with an advertiser share price proportionate to the revenue generated by the ad associated with the advertiser compared to the total revenue generated by all advertisers associated with the system 100.

The system 100 can provide liquidated shares to the advertiser and/or store or reinvest the advertiser shares in the advertiser compensation account 124 until the advertiser requests a cash distribution.

Similarly, the system 100 can distribute user compensation shares from the user compensation account 126 via a user disbursement module 130. The disbursement may be based on the number of social network behaviors of an individual user over a period of time divided by the total number of behaviors for the social network platform over the same time period for a particular ad associated with an advertiser. The system 100 can distribute user compensation shares at regular time intervals. The distribution can be in the form of user compensation shares that can be stored in the system 100. In an example, the distributed user compensation shares can be in the form of user points that can be stored in a database 104 in communication with the server 102. The user can use the user points as a form of currency in an online store associated with the system 100.

The relevant behavior used to track ad interactions can be defined by the system administrators, the users, and/or the advertisers. For example, relevant behaviors can include posting the ad on the user's social media feed/website, having third-parties associated with the user share the ad on their social media feed, the number of likes the user receives on his/her social media feed associated with the posted advertisement, among others. In an example, behavior can be associated with the total views by a third-party on a user's social media page. In an example, behavior can be associated with the viewing by a third-party of the ad on a user's social media page, the third-party engaging with the ad posting, and the third-party visiting the website of the company associated with the ad. The total views can be associated with the number of "likes" of the ad on a user's social media page, shares of the ad on the third-party's social media feed/website, etc. The user and/or advertiser can require a third-party to complete any of a variety of tasks. For example, for a user to receive credit for the behavior, the user displaying the ad may require the third-party to "like" the user's page or "like" the company's page or other social media site.

The system 100 can also determine the user compensation based on a visibility factor of the user, for example, the number of contacts, followers, friends, and/or reputation associated with the user and/or user shared platform. The system 100 can also calculate the user compensation based on tracking the ad views, likes, forwards, and/or ad clicks by third-parties to quantify the user share of the ad revenue.

Further, user compensation can be determined, at least in part, as a function of the number of distinct sharing platforms selected for sharing each ad, the number of integrated posts, the level of integration of the ad content with the user's post, etc. For example, the user compensation may be proportionate to the level of integration. A low integration could be associated with a user merely posting the ad content on his or her shared platform. A high level of integration could be, not only posting the ad on the shared platform, but further adding personal content regarding the product or service associated with the ad.

Different behaviors can be weighted differently, wherein the weighted factors can be defined by the system administrators, advertisers, and/or users. For example, the user behavior that includes a third-party not only liking the user's post associated with the ad, but also requires the third-party sharing the ad on the third-party's social media feed may have a higher weight, and ultimately result in more user shares, than user behavior of just posting the ad on the user's social media page.

In an example, the ad revenue can be converted to points and distributed as dividends to users at regular time intervals (e.g., weekly, monthly, annually, etc.). A user's dividend may be proportional to the user's social interaction (e.g., the number of likes the user receives, number of followers of the user, etc.) For example, 70-90% of the ad revenue can be converted to points and distributed as dividends to users and/or advertisers. The system can extract 10-30% of the revenue in a profit account for the system. Of course, the revenue splits may be in any proportion, as will be recognized by those skilled in the art.

The system 100 can store and update the points of each user in the database 104 in communication with the server 102. For example, the database 104 can include a plurality of user identifications and associated user points.

In an example, the user can use the points to buy goods and services in an online shop 132 associated with the system 100. For example, the system 100 can include an online shop 132 that can sell goods and services associated with the advertising brands. Alternatively, the system 100 can be in communication with an external online shop 132 that the system 100 coordinates payment to the online shop 132 based on the points accumulated by the user and updates the user's account accordingly.

In an example, the user's points can have an expiration date. For example, if a user's points are not redeemed through the online shop 132 within 12-18 months, a percentage (e.g., 30%, 50%, 70%, etc.) of the expiring points can be returned to the pool of advertising revenue 122 each week, month, year, etc. Users can extend or reset the expiration date of the points by making a purchase. Further, users can buy more points directly from the system 100 to increase the number of points to spend in the online shop 132.

In an example, the system 100 can include an online shop 132 that can function as a virtual storefront for each advertiser. In an example, upon purchase of the goods and/or services via the online shop 132, the goods or service can be provided directly from the advertiser. In an example, virtual goods sold in the online shop 132 can be provided to the buyer directly from the online shop 132 and/or directly from the advertiser.

The system 100 can apply a sales royalty to each shop transaction. For example, the system 100 can apply a 35% sales royalty to each shop transaction. The cash value of the remaining points can be distributed to advertiser associated with the purchased good or service.

In an example, the portion of the purchase price allocated to the advertiser can be stored in the advertiser compensation pool 124. The advertiser can use their portion of funds in the advertiser compensation pool 124 to promote new ads. For example, an advertiser can pay the system 100 to publish (e.g., make available to users to share on the user shared platform) a new ad from the funds in the advertiser compensation pool 124. The advertiser compensation pool 124 from the online shop 132 can be used to pay for the incentives associated with user behavior with the selected ad associated with the advertiser.

The following is an example of the present system 100. In this example, the system 100 accumulates 900 M points that form $900 k of ad revenue. Out of the 100 M total likes, User A accumulates 100 likes of the user's post on social media, earning User A 900 points for the month. User A can use the 900 points to buy goods and services in the online shop 132 associated with the system 100.

Turning back to FIG. 1, the system 100 can include a software platform provided by the server 102 and made accessible to system administrators, users, and advertisers. For example, the system 100 can include a user module 134, an advertiser module 136, and an administration and online store module 138.

The user module 134 can include a user interface accessible through a user device 120 such as a computer, a mobile device, among others. The user module 134 can display the ads from which the user can choose to display on the user shared platform. Through the user module 134, the system 100 can provide a summary of the user compensation history, the present ads selected by the user, the time frames for the user to display each ad, among other metrics. The system 100 can also provide the user compensation in the form of points that can be used in the online shop 132. The system 100 can display a prompt on the user interface for a user to enter the online shop 132.

The advertiser module 136 can include an advertiser interface accessible through an advertiser device 118 such as a computer, a mobile device, among others. Through the advertiser module 136, the system 100 can display the advertiser compensation history, the user identification and/or user shared platforms the ad will be displayed within a time frame, the current advertising revenue, among other metrics. The advertiser can upload individual ads and/or ad campaigns in the advertiser module 136 from which the system 100 can communicate to the user module 134. For example, advertisers can upload still images, pictures, videos, icons, emblems, taglines, links, text, logos, etc. The advertiser can also define ad parameter for users, for example, by assigning incentive values for various levels of user behaviors associated with the ad. For example, the incentive values can be rewarded to users based on the user activity with the ad, wherein the system 100 can grant the incentive value to the user upon meeting the advertiser's requirements regarding the ad. The advertisers can enter parameters related to the ad including, but not limited to, the intended audience (e.g., demographic data of intended audience members). Alternatively, or in addition to, the system 100 may automatically determine the intended audience based on the analysis of the ad without any additional input from the advertiser.

The administration and online store module 138 can include an administration and online store interface through which the system 100 can display a variety of virtual advertiser store fronts with which the user or advertiser can engage. For example, each advertiser can have their own virtual store front. Alternatively, the system 100 can display, on the administration and online store interface, a variety of goods and services from a plurality of different advertisers associated with the system 100. The administration and online store module 138 can include a payment module that is in communication with the user module 134, wherein the system 100 can deduct user points from the user's account to pay for any selected goods or services by the user. In addition, the payment module can accept other forms of payment that can be used in addition to the user points to complete payment of a good or service that costs more than the amount of user points that the user has accumulated or may be used to buy additional user points within the system 100.

As mentioned above, aspects of the systems and methods described herein are controlled by one or more servers (i.e., controllers). The one or more controllers may be adapted to run a variety of application programs, access and store data, including accessing and storing data in the associated databases, and enable one or more interactions as described herein. Typically, the controller is implemented by one or more programmable data processing devices. The hardware elements, operating systems, and programming languages of such devices are conventional in nature, and it is presumed that those skilled in the art are adequately familiar therewith.

For example, the one or more controllers may be a PC based implementation of a central control processing system utilizing a central processing unit (CPU), memory and an interconnect bus. The CPU may contain a single microprocessor, or it may contain a plurality of microprocessors for configuring the CPU as a multi-processor system. The memory may include a main memory, such as a dynamic random access memory (DRAM) and cache, as well as a read only memory, such as a PROM, EPROM, FLASH-EPROM, or the like. The system may also include any form of volatile or non-volatile memory. In operation, the memory stores at least portions of instructions for execution by the CPU and data for processing in accord with the executed instructions.

The one or more controllers may also include one or more input/output interfaces for communications with one or more processing systems. Although not shown, one or more such interfaces may enable communications via a network, e.g., to enable sending and receiving instructions electronically. The communication links may be wired or wireless.

The one or more controllers may further include appropriate input/output ports for interconnection with one or more output mechanisms (e.g., monitors, printers, touchscreens, motion-sensing input devices, etc.) and one or more input mechanisms (e.g., keyboards, mice, voice, touchscreens, bioelectric devices, magnetic readers, RFID readers, barcode readers, motion-sensing input devices, etc.) serving as one or more user interfaces for the controller. For example, the one or more controllers may include a graphics subsystem to drive the output mechanism. The links of the peripherals to the system may be wired connections or use wireless communications.

Although summarized above as a PC-type implementation, those skilled in the art will recognize that the one or more controllers also encompasses systems such as host computers, servers, workstations, network terminals, and the like. Further one or more controllers may be embodied in a device, such as a mobile electronic device, like a smartphone or tablet computer. In fact, the use of the term controller is intended to represent a broad category of components that are well known in the art.

Hence aspects of the systems and methods provided herein encompass hardware and software for controlling the relevant functions. Software may take the form of code or executable instructions for causing a controller or other programmable equipment to perform the relevant steps, where the code or instructions are carried by or otherwise embodied in a medium readable by the controller or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as the memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a controller can read programming code and/or data. Many of these forms of computer readable media may be involved in carrying one or more sequences of one or more instructions to a processor for execution.

It should be noted that various changes and modifications to the embodiments described herein will be apparent to those skilled in the art. Such changes and modifications may be made without departing from the spirit and scope of the present invention and without diminishing its attendant advantages. For example, various embodiments of the systems and methods may be provided based on various combinations of the features and functions from the subject matter provided herein.

We claim:

1. A system comprising:
    a first online content server providing a first social media environment in which a first piece of online content is presented, the first social media environment including:
        a first user first social media environment account associated with a first user in which the first user takes one or more actions to interact with the first piece of online content in the first social media environment; and
        a second user first social media environment account associated with a second user in which the second user takes one or more actions to interact with the first piece of online content in the first social media environment;
    a second online content server providing a second social media environment in which the first piece of online content is presented, the second social media environment including:
        a first user second social media environment account associated with the first user through which the first user takes one or more actions to interact with the first piece of online content in the second social media environment; and
        a second user second social media environment account associated with the second user through which the second user takes one or more actions to interact with the first piece of online content in the second social media environment;
    a first end user device through which the first user:
        accesses the first user first social media environment account and takes one or more actions to interact with the first piece of online content in the first social media environment; and
        accesses the first user second social media environment account and takes one or more actions to interact with the first piece of online content in the second social media environment;
    a second end user device through which the second user:
        accesses the second user first social media environment account and takes one or more actions to interact with the first piece of online content in the first social media environment; and
        accesses the second user second social media environment account and takes one or more actions to interact with the first piece of online content in the second social media environment;
    a database storing:
        a total social media interaction record associated with the first piece of online content;
        a first social media environment interaction record associated with both of the first piece of online content and the first social media environment;
        a second social media environment interaction record associated with both of the first piece of online content and the second social media environment;
        a first user interaction record associated with the first user;
        a second user interaction record associated with the second user;
        an advertiser compensation pool record associated with the first piece of online content;
        a user compensation pool record associated with the first piece of online content;
        a first advertiser compensation record associated with the first online content server;
        a second advertiser compensation record associated with the second online content server;
        a first user compensation record associated with the first user; and
        a second user compensation record associated with the second user;
    a system server including a controller, the system server being in communication with the database, the first online content server, and the second online content server;
    a memory in communication with the controller, wherein the memory stores program instructions executable by the controller such that, in response to execution of the program instructions, the controller:
        apportions an accounting of funds allocated to a pool of revenue associated with the first piece of online content between the advertiser compensation pool record and the user compensation pool record and communicates with the database to store apportioned funds in the advertiser compensation pool record and the user compensation pool record;
        in communication with each of the first online content server through a first online content server application programming interface and the second online content server through a second online content server application programming interface, determines a total number of user interactions with the first piece of online content across all of a plurality of social media environments based on one or more actions to interact with the first piece of online content taken by the first user through the first end user device and by the second user through the second end user device and communicates with the database to store the number in the total social media interaction record associated with the first piece of online content;
        in communication with the first online content server through the first online content server application programming interface, determines a number of user interaction with the first piece of online content attributable to the first social media environment and communicates with the database to store the number in the first social media environment interaction record;
        in communication with the second online content server through the second online content server application programming interface, determines a number of user interaction with the first piece of online content attributable to the second social media environment and communicates with the database to store the number in the second social media environment interaction record;
        in communication with each of the first online content server through the first online content server application programming interface and the second online content server through the second online content server application programming interface, determines a number of user interaction with the first piece of online content attributable to the first user first social media environment account and the first user second social media environment account and communicates with the database to store the number in the first user interaction record;

in communication with each of the first online content server through the first online content server application programming interface and the second online content server through the second online content server application programming interface, determines a number of user interaction with the first piece of online content attributable to the second user first social media environment account and the second user second social media environment account and communicates with the database to store the number in the second user interaction record;

communicates with the database to store a portion of the value in the advertiser compensation pool record in the first advertiser compensation record, wherein the portion of the value in the advertiser compensation pool record that is stored in the first advertiser compensation record is equal to a proportion calculated by comparing the total social media interaction record and the first social media environment interaction record;

communicates with the database to store a portion of the value in the advertiser compensation pool record in the second advertiser compensation record, wherein the portion of the value in the advertiser compensation pool record that is stored in the second advertiser compensation record is equal to a proportion calculated by comparing the total social media interaction record and the second social media environment interaction record;

communicates with the database to store a portion of the value in the user compensation pool record in the first user compensation record, wherein the portion of the value in the user compensation pool record that is stored in the first user compensation record is equal to a proportion calculated by comparing the total social media interaction record and the first user interaction record;

communicates with the database to store a portion of the value in the user compensation pool record in the second user compensation record, wherein the portion of the value in the user compensation pool record that is stored in the second user compensation record is equal to a proportion calculated by comparing the total social media interaction record and the second user interaction record;

disburses the funds apportioned to the advertiser compensation pool record based on the first advertiser compensation record and the second advertiser compensation record; and disburses the funds apportioned to the user compensation pool record based on the first user compensation record and the second user compensation record.

2. The system of claim 1, wherein the one or more actions to interact with the first piece of online content includes one or more of views, likes, shares, and comments.

3. The system of claim 2, wherein, when calculating the total number of user interactions with the first piece of online content, the one or more actions to interact with the first piece of online content are weighted based on type of action.

4. The system of claim 1, further wherein execution of the program instructions causes the controller to provide an online virtual store providing at least one product for sale.

5. The system of claim 4, wherein revenue generated by sales in the online virtual store is distributed, at least in part, into the pool of revenue associated with the first piece of online content.

6. The system of claim 4, wherein funds dispersed from the user compensation pool record are used to purchase the at least one product for sale.

\* \* \* \* \*